United States Patent [19]

Artieri

[11] Patent Number: 5,825,372
[45] Date of Patent: Oct. 20, 1998

[54] IMAGE PROCESSING SYSTEM INCLUDING A VARIABLE SIZE MEMORY BUS

[75] Inventor: Alain Artieri, Meylan, France

[73] Assignee: SGS-Thomson Microelectronics S.A., Saint Genis, France

[21] Appl. No.: 267,195

[22] Filed: Jun. 29, 1994

[30] Foreign Application Priority Data

Jun. 30, 1993 [FR] France .................................. 93 08218

[51] Int. Cl.⁶ ............................................. G06F 12/02
[52] U.S. Cl. .......................................... 345/509; 345/512
[58] Field of Search ................................... 395/166, 375, 395/307, 118, 162, 164, 165, 507, 515, 521, 523, 509, 512

[56] References Cited

U.S. PATENT DOCUMENTS

| | | | |
|---|---|---|---|
| 4,291,370 | 9/1981 | Charles | 395/307 |
| 4,561,072 | 12/1985 | Arakawa et al. | 365/189.04 |
| 4,837,844 | 6/1989 | Urushibata | 382/293 |
| 4,860,198 | 8/1989 | Takenaka | 395/307 |
| 5,394,528 | 2/1995 | Kobayashi et al. | 395/307 |
| 5,400,075 | 3/1995 | Savatier | 348/384 |
| 5,504,484 | 4/1996 | Wilson | 341/67 |
| 5,537,624 | 7/1996 | Whitesell | 395/872 |

OTHER PUBLICATIONS

Microprocessors And Microsystems, vol. 3, No. 10, Dec. 1979, London, pp. 435–441, Whitworth, "Designing Flexibility Into Memory Systems".

Patent Abstract Of Japan, vol. 16, No. 368 (P–1398) Aug. 7, 1992 & JP–A–04114246 (Hitachi).

Electronic Design, vol. 41, No. 9, May 3, 1993, New Jersey, pp. 117–120, Bursky, "Image–processing Chip Set Handles Full–Motion Video".

*Primary Examiner*—Tod R. Swann
*Assistant Examiner*—Christopher S. Chow
*Attorney, Agent, or Firm*—Wolf, Greenfield & Sacks, P.C.

[57] ABSTRACT

A system incorporates a processor that includes a data bus having a fixed N-bits size connected to an n-bits word memory through a bus having an n-bits size, where N is a multiple of n, and n is a variable value. The system includes means for, at each execution by the processor of a write instruction of one word of N bits in the memory, successively writing each sub-word of n bits constituting this word of N bits at distinct addresses, and means for, at each execution of a read instruction of a word of N bits in the memory, successively reading in this memory at distinct addresses sub-words of n bits, and juxtaposing these sub-words on the fixed size bus.

22 Claims, 13 Drawing Sheets

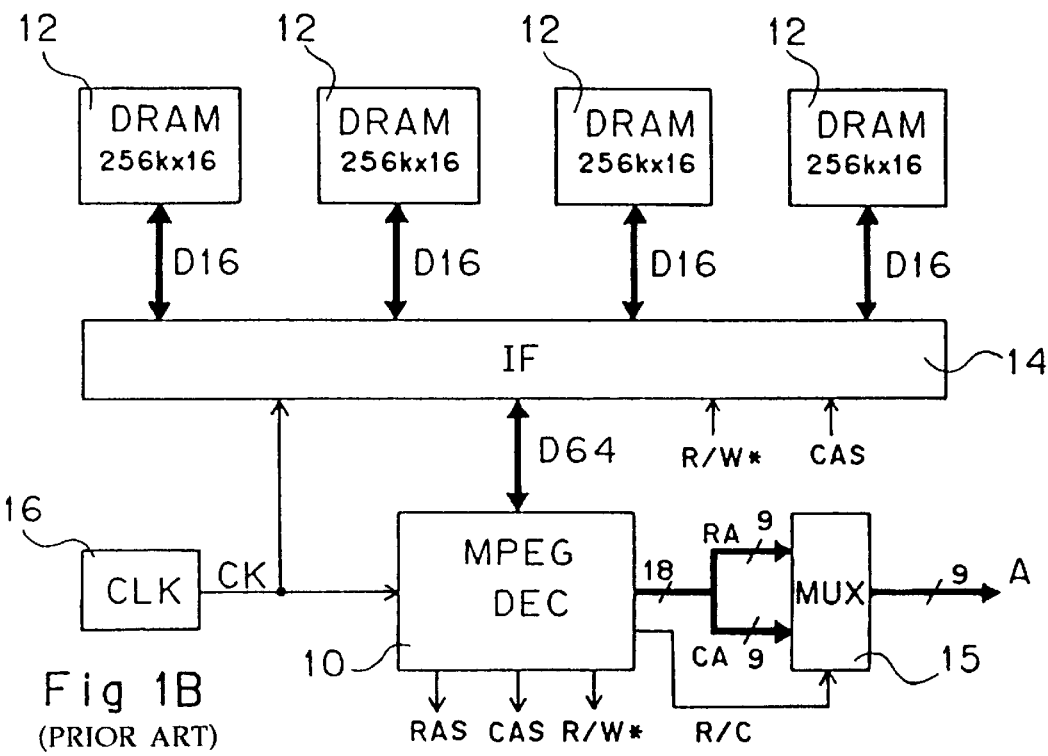
Fig 1A (PRIOR ART)
Fig 1B (PRIOR ART)
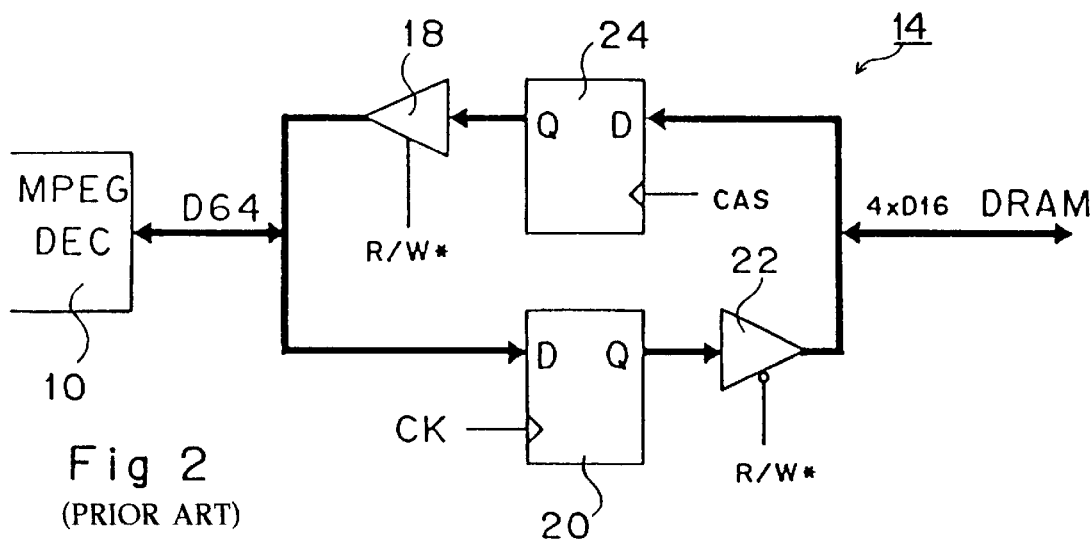
Fig 2 (PRIOR ART)

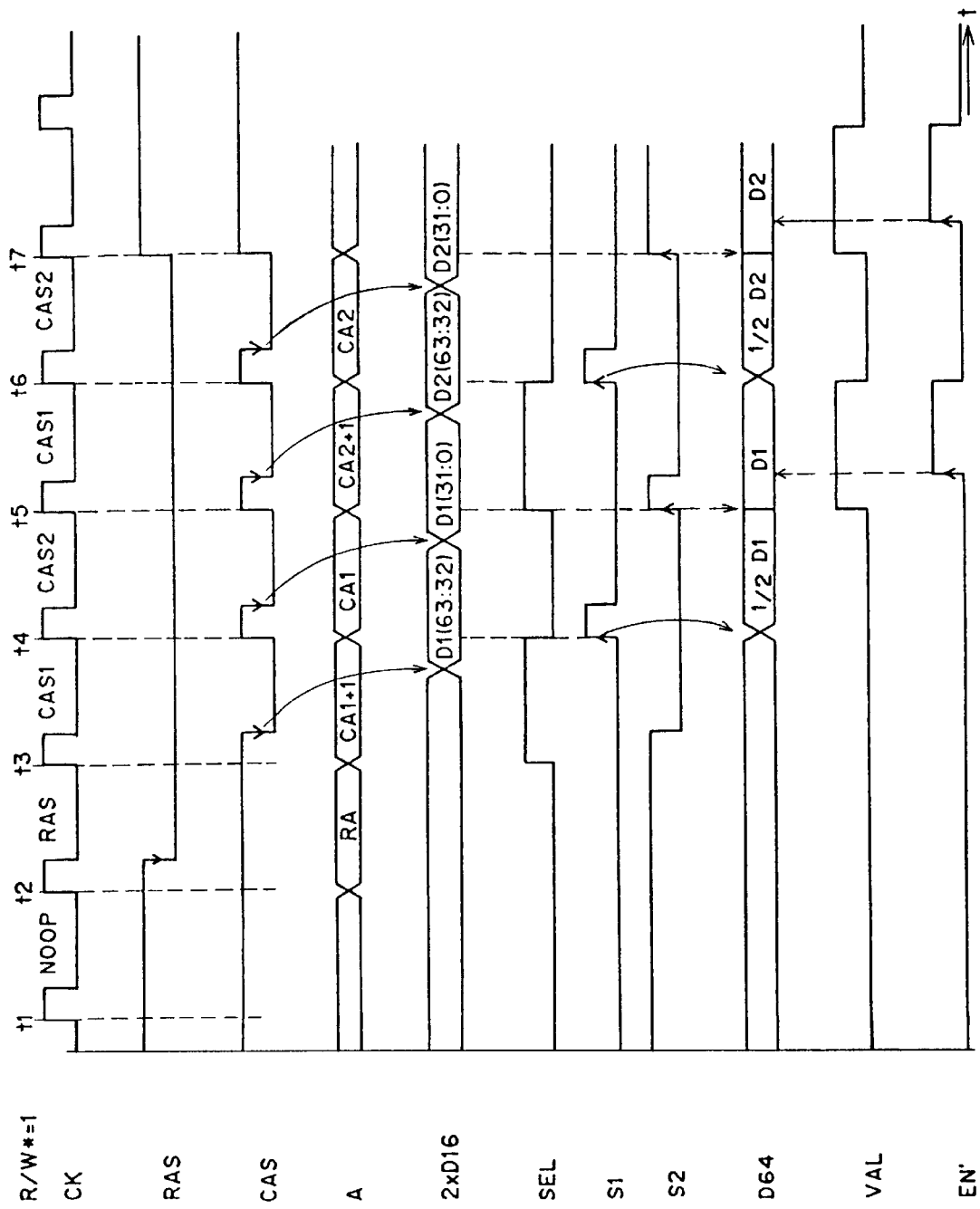

IMAGE PROCESSING SYSTEM INCLUDING A VARIABLE SIZE MEMORY BUS

BACKGROUND OF THE INVENTION

1. Field of the Invention

The present invention generally relates to systems incorporating a processor communicating with a variable size dynamic memory.

The invention more particularly relates to an image processing system incorporating a processor that controls data transfers between various memory fields as well as between the memory fields and one input and one output of the system.

2. Discussion of the Related Art

FIG. 1A represents an exemplary arrangement of a memory used for decoding 720×480-pixel images according to an MPEG standard. The size of this memory is 16 megabits. Three memory fields IB1–IB3 of 4 megabits each are image buffers and respectively include data corresponding to a decoded image.

The 4 remaining megabits include a field CD of approximately 3.3 megabits containing compressed (encoded) image data and one field PD of approximately 0.7 megabit containing so-called "private" data that are not used for decoding but are used to impart user-friendly functions to the decoder, for example, to superpose information on the image being displayed on the screen.

In accordance with MPEG standards, three image buffers IB1–IB3 are to be provided. There are three types of decoding, referred to as "intra", "predicted" and "bidirectional".

According to intra decoding, encoded data coming from field CD directly correspond to an image stored in one of buffers IB1–IB3.

According to predicted decoding, encoded data CD correspond to a portion of an image that must be combined with a portion of an image that was previously decoded; thus, one image buffer is required to contain the image already decoded, and one buffer to contain the image being decoded.

According to bidirectional decoding, encoded data CD correspond to a portion of an image that must be combined with two portions of an image that are respectively fetched in two images that were already decoded; therefore, two buffers are required to store the two images already decoded, and one buffer is required to store the image being decoded.

Each predicted or bidirectional decoding is of the progressive or interleaved type. In the progressive type, one portion of an image is fetched in an image that was already decoded, this image portion corresponding to a series of even and odd lines. In the interleaved type, two portions of an image are fetched in a same image that was already decoded, one of the portions corresponding to even lines, and the other portion to odd lines.

Moreover, the predicted type is of the forward or backward type. In the forward type, one portion of the image is fetched in an image preceding, in the display order, the image currently decoded. In the backward type, one portion of the image is fetched in an image that follows, in the display order, the image currently decoded. This implies that the coded images arrive in an order different from that of the display order. In addition to the buffer including the image currently decoded, two additional buffers are required to store one image for a forward prediction and one image for a backward prediction, respectively.

FIG. 1B schematically represents a conventional exemplary architecture of an MPEG decoder, at the interface between a decoding circuit or processor 10, and a memory. The memory is generally a dynamic memory (DRAM) that is inexpensive and not cumbersome. The dynamic memory of a decoding system MPEG is partitioned into four blocks 12, each block having a capacity of 256 16-bit kilowords (4 megabits). Each block 12 is connected to an interface 14 through a 16-bit data bus D16. The interface 14 is connected to the MPEG decoding circuit 10 through a 64-bit data bus D64, usually referred to as a "system bus". Thus, the memory of the system is configured to contain 256 kilowords of 64 bits.

To access 256 kilowords, a 18-bit address bus is used. A dynamic memory is partitioned into several fields referred to as pages. To access a word of a dynamic memory, a first address cycle, usually referred to as a Row Address Strobe (RAS), for selecting one of the pages, is first carried out; then, a second address cycle, usually referred to as a Column Address Strobe (CAS), for selecting one word in the page, is carried out. In fact, in the given example, the dynamic memory is provided with a 9-bit address A which, during a RAS cycle, corresponds to the 9 most significant bits RA of the address RA+CA issued by processor 10 and, during a CAS cycle, to the 9 least significant bits CA of the same address. A multiplexer 15, controlled by a signal R/C provided by processor 10, selects the most significant bits RA or the least significant bits CA to be provided as an address A to the dynamic memory.

To indicate to the dynamic memory whether an address cycle RAS or an address cycle CAS is carried out, processor 10 enables a signal RAS or a signal CAS, respectively. Additionally, circuit 10 provides a signal R/W* selecting the read or write mode of the memory.

The circuit set is controlled by a clock signal CK provided by a clock generator (CLK) 16.

FIG. 2 represents an embodiment of a conventional memory interface 14. The bus D64 is coupled to the output of a set of three-state gates 18 and to the input of a set of flip-flops 20. The three-state gates 18 are controlled by the signal R/W* and flip-flops 20 are controlled by the clock signal CK. The four juxtaposed buses D16 are coupled to the output of a set of three-state gates 22 and to the input of a set of flip-flops 24. The three-state gates 22 are controlled by the complement of signal R/W* and receive the outputs of flip-flops 20. Flip-flops 24 are controlled by signal CAS and their outputs are connected to the three-state gates 18.

Further explanations on the manner to realize an interface between a dynamic memory and another circuit can be found in any data sheet of a dynamic memory.

In a full MPEG decoding system, as above indicated, at least three image buffers are required. A full MPEG encoding/decoding system provides a high compression ratio so as to enable transmission of the encoded data with a frequency compatible with Hertzian waves. In cable television systems, the admissible frequency is higher, so it is unnecessary to have such high compression ratios. Thus, it is possible to provide, for cable transmissions, an MPEG encoding/decoding system using intra encoding and forward predicted encoding only. The decoder used in such a system requires two image buffers only. Thus, four megabits of memory would be spared.

However, with a system such as the one of FIG. 1B, blocks 12 are standard components whose 256-kiloword capacity is the minimum standard value. Thus, if it is desired to decrease the size of the memory, one or more blocks 12 must be eliminated, resulting in a reduced size of the memory bus. Modifying the size of the memory bus involves the modification of the architecture of the MPEG decoder, particularly of the various peripheral elements that are connected to the system bus D64, that exchange data with the memory.

SUMMARY OF THE INVENTION

A general object of the present invention is to provide a system incorporating a processor that can be adapted to a memory bus having a variable size, without it being necessary to modify the architecture of the peripheral elements exchanging data with the memory.

A further object of the invention is to provide an MPEG decoder capable of operating with a memory having a predetermined size or with a memory having a halved capacity, that can be realized in a simple manner by using a conventional MPEG decoder.

To achieve these objects, the present invention provides a system incorporating a processor that includes a data bus having a fixed N-bits size and is connected to an n-bits word memory through a bus having an n-bits size, where N is a multiple of n, and n is variable. The system includes means for, at each execution by the processor of a write instruction of one N-bits word in the memory, successively writing each sub-word of n bits constituting the N-bits word at distinct addresses, and means for, at each execution of a read instruction of a N-bits word in the memory, successively reading in the memory at distinct addresses sub-words of n bits, and juxtaposing these sub-words on the fixed size bus.

According to an embodiment of the invention, the system includes means for locking each read or write instruction in the processor during (N/n)−1 instruction cycles, so that a same read or write instruction is executed N/n times.

According to an embodiment of the invention, the locking means include means for inhibiting the incrementation of an instruction pointer of the processor.

According to an embodiment of the invention, the locking means include means for inhibiting the sending of a clock signal to the processor.

According to an embodiment of the invention, the system includes means for multiplying by N/n the memory addresses provided by the processor and for incrementing or decrementing the addresses at each execution of a same read or write instruction.

According to an embodiment of the invention, the system includes devices that are connected in order to receive N-bits data on the fixed size bus through the activation of respective enabling signals, each being normally activated at each execution of a read instruction. Means are provided for authorizing the activation of the enabling signals only during the execution of the last one of the N/n same read instructions.

According to an embodiment of the invention, the system includes devices that are connected to write N-bits data on the fixed size bus through the activation of respective enabling signals, each being normally enabled each time a write instruction is executed. Means are provided for authorizing the activation of the enabling signals only during the execution of the first of the N/n same write instructions.

According to an embodiment of the invention, the system includes address folding means, so that the addresses received by the memory are contained within a predicted field if the addresses issued by the processor are greater than the upper limit of the field.

According to an embodiment of the invention, the system is a system for decoding images that are encoded in accordance with an MPEG standard, and the memory field stores the decoded images. This memory field has a size smaller than the size of the two images to be displayed, and means are provided to stop decoding before the decoded data are written over data corresponding to a portion of an image not yet displayed.

The foregoing and other objects, features, aspects and advantages of the invention will become apparent from the following detailed description of the present invention when taken in conjunction with the accompanying drawings.

BRIEF DESCRIPTION OF DRAWINGS

FIGS. 1A and 1B, above described, represent a conventional memory architecture of an MPEG decoder and a conventional link between the memory and a system bus;

FIG. 2 represents a conventional detailed exemplary interface between a system bus and a memory bus;

FIGS. 7A and 7B represent write and read cycles on a reduced size memory bus according to the invention;

DETAILED DESCRIPTION

The present invention will be described in connection with an incomplete MPEG encoding/decoding (CODEC) system, that is, a system that only uses the intra encoding and the direct predicted encoding. Those skilled in the art will note that the invention also can apply to a full encoding/decoding system which processes half-size images.

An incomplete system has a smaller compression ratio than a full system, while remaining compatible with a wired transmission of encoded data. As indicated above, the decoder of such a system requires only two image buffers.

The present invention proposes a decoder architecture able to be used both in a full MPEG encoding/decoding system and in an incomplete encoding/decoding system including half the memory of the complete system, without modifying the architecture of the peripheral elements connected to the system bus. With such an architecture, two problems are encountered.

First, as indicated above, halving the memory size causes the size of the memory bus to be divided by two. This involves, if it is desired to continue to exchange data between the memory and the other elements of the decoder, the need for modifying the architecture of these elements. To avoid this modification, the invention proposes to maintain a fixed size system bus and to realize a specific interface (described hereinafter) between the system bus and a variable size memory bus.

In addition, halving the memory size does not theoretically leave enough space to contain two image buffers and compressed data.

Figure 3:
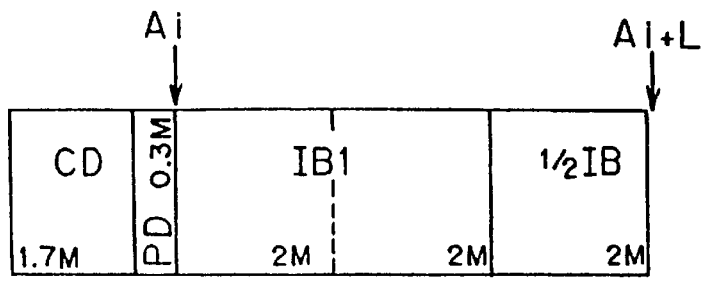
FIG. 3 represents an exemplary memory architecture of an MPEG decoder according to the invention.

FIG. 3 represents an exemplary architecture of a memory whose size is halved according to the invention. The memory includes a 4-Mbit image buffer IB1 starting at an address Ai and a 2-Mbit half image buffer ½IB ending at an address Ai+L. There remain 1.75 Mbits for the encoded data CD and 0.25 Mbit for the private data PD. The MPEG-2 standard recommends that the number of encoded data to be stored should not exceed 1.75 Mbits.

According to an aspect of an MPEG decoder according to the invention less than 2 image buffers (1.5 in the present example) are used instead of 2 as in conventional decoders. Hereinafter, the method according to the invention for using 1.5 image buffers is described.

Figure 4A:
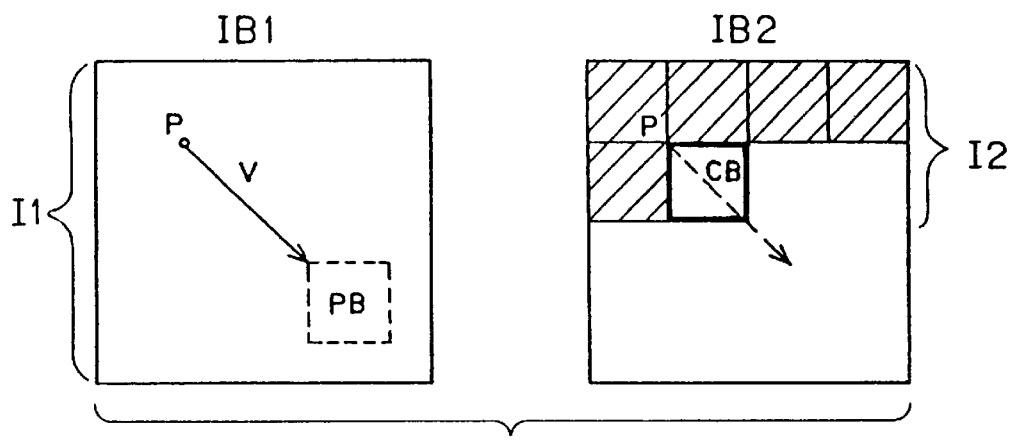
FIG. 4A illustrates a predicted decoding step with a conventional memory architecture.

FIG. 4A illustrates a conventional predicted decoding using two image buffers IB1 and IB2. Buffer IB1 contains an image I1 that has been previously decoded, and buffer IB2 contains an image I2 being decoded. In buffer IB2, the hatched area represents the portion of image I2 that has been decoded.

The image decoding step is carried out block after block, each block generally corresponding to image squares including 16×16 pixels. In buffer IB2, a solid line represents a block CB being decoded. If block CB originates from a predicted decoding, it is reconstructed from a predicted block PB that is fetched in the preceding image I1. To find the predicted block PB, the data serving to the decoding of block CB provide a vector V that defines the position of the predicted block PB with respect to the position P of block CB in the image.

Figure 4B:
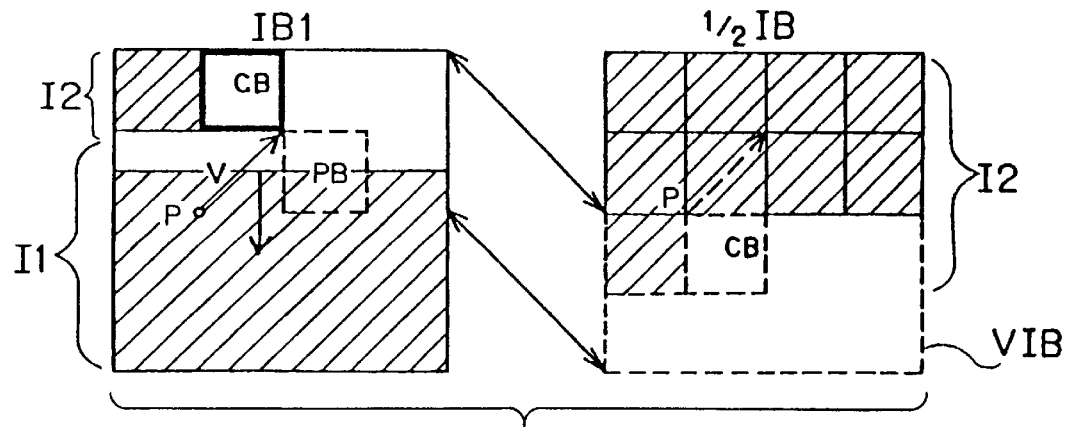
FIG. 4B illustrates a predicted decoding step with a memory architecture according to the invention.

FIG. 4B illustrates a predicted decoding cycle in a memory structured according to the invention. Buffer IB1 initially contains a previously decoded image I1 that is being displayed. Image I1 is displayed line after line. In the lower portion of buffer IB1, a hatched area represents the portion of image I1 that has not yet been displayed.

The half buffer ½IB is entirely filled with an image I2 being reconstructed. The half buffer ½IB is enlarged by a virtual area VIB drawn in dotted lines so that the sum of this virtual area and of the half buffer ½IB corresponds to a complete image buffer. As represented, the block CB of image I2 being reconstructed is in the virtual area VIB. In fact, due to an address folding device (described hereinafter), the virtual area VIB is mapped in the first half of the image buffer IB1. Thus, the real current block CB of image I2 is, as represented in solid lines, within the first half of buffer IB1.

Thus, a first requisite to be met for correct operation with such a memory structure is that the field of buffer IB1 where are written blocks CB of image I2 should correspond to a field already displayed of image I1, as shown in FIG. 4B. For this purpose, a system (described hereinafter) is provided for inhibiting decoding when the image being decoded (I2) reaches a field not yet displayed of the image being displayed (I1). The use of such a system is possible because the decoding duration of an image is, in an average, strictly shorter than the display duration of an image.

A second requisite to ensure correct operation is that the fields of buffer IB1 that are occupied by image I2 being reconstructed should not correspond to predicted blocks to be fetched in the previously decoded image I1, since these predicted blocks would be written over by the blocks of image I2. As shown, the position of a predicted block PB serving to the reconstruction of the current block CB is determined by a vector V the origin of which, in image I1, is the position P corresponding to the position of the virtual block CB in image I2. It is noted that, if the height of vector V can reach the height of a half-image minus the height of a block, there is a risk to fetch in image I1 a predicted block that has already been written over. In practice, the height of vector V is limited to a value substantially smaller than the height of a half image. Particularly, the MPEG-2 standard limits the height of vector V to 128 pixels for an incomplete encoding/decoding system, whereas the height of a half image is 240 pixels, for example. Therefore, there is no risk to fetch a predicted block written over by the image being reconstructed.

Generally, this second requisite is always met if buffer ½IB has a sufficient size to contain Hv+16 image lines, where 16 is the height of a block and Hv is the maximum height of vector V. Thus, in the example of 720×480-pixel images, and of a vector V having a maximum height of 128 pixels, in fact, a 0.3-image buffer ½IB is sufficient.

Once image I2 is reconstructed and image I1 is displayed, the beginning of image I2 is in buffer ½IB and the end of image I2 is in the first half of buffer ½IB. A subsequent reconstructed image will first fill the second half of buffer IB1, then buffer ½IB, in the same manner as the second half of image I2 filled the first half of buffer IB1, and so forth.

Figure 5:
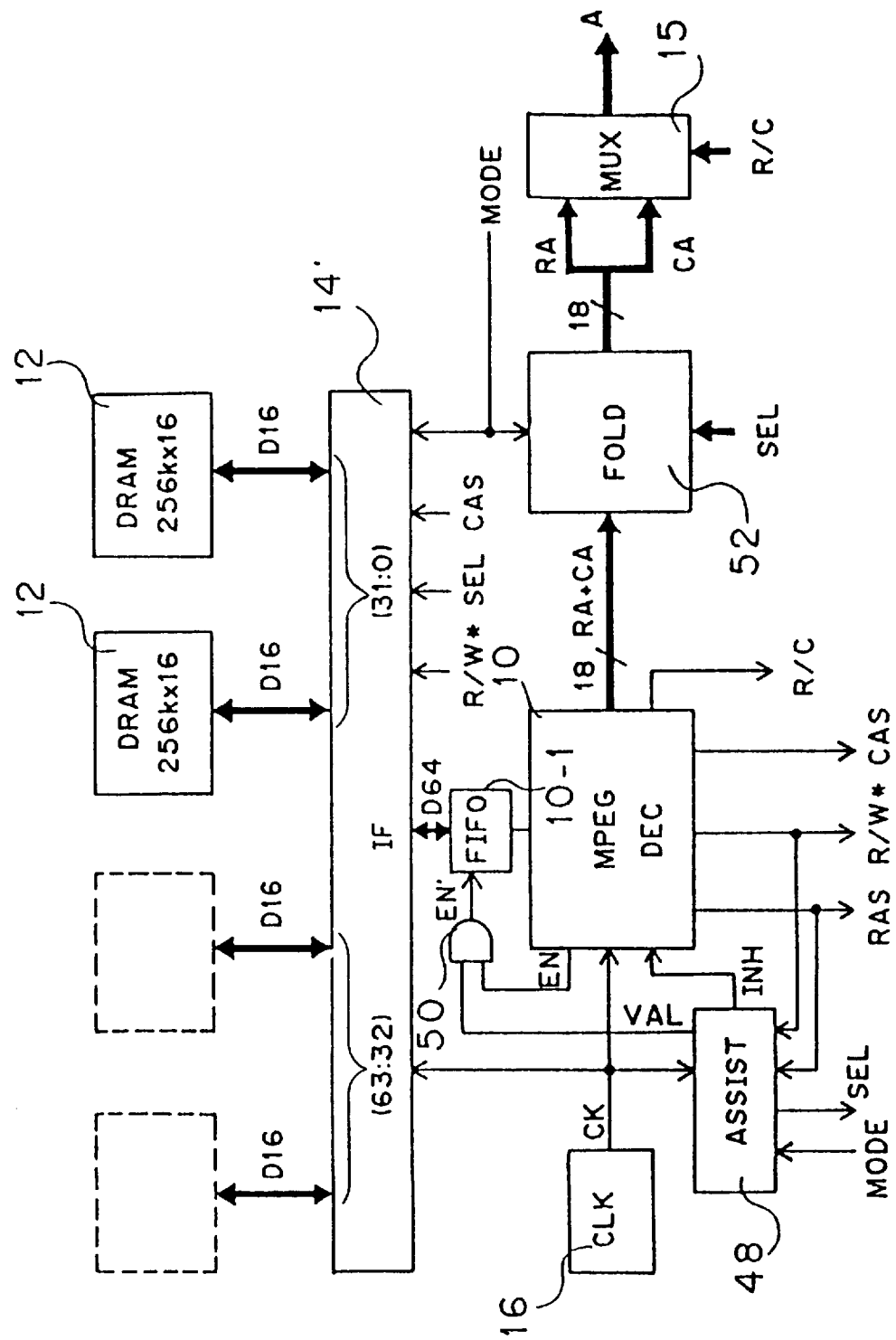
FIG. 5 schematically represents an embodiment of an MPEG decoder architecture according to the invention.

FIG. 5 schematically represents an architecture of an MPEG decoder including a memory bus having a variable size according to the invention. Same elements as in FIG. 1B are labeled with same reference characters. The two least significant memory buses D16 are connected to memory blocks 12. The two most significant buses D16 are not connected to memory devices. The state of a line MODE indicates to the decoder whether the two most significant buses D16 are provided with memory or not. The circuit interfacing the memory, here referenced 14' and described below, is modified with respect to the circuit of FIG. 1B, as a function of the state of line MODE, in order to route the 64 lines of bus D64 to the lines of the four buses D16, or only to the lines of the two least significant buses D16. For this purpose, the interface 14' also receives a selection signal SEL that is provided by an assistance circuit 48. Circuit 48 receives the line MODE, signals CK, RAS, R/W*, and further provides signals VAL and INH whose functions will be described below.

As shown in FIG. 5, the bus D64 is connected to first-in/first-out (FIFO) buffer memories 10-1 conventionally incorporated in the decoding circuit 10. A plurality of these FIFOs can be accessed in write mode by bus D64, the remaining FIFOs being accessed in read mode. In the conventional system of FIG. 1B, each FIFO is enabled by a signal EN when it must transmit data on the bus D64 or read data from bus D64. In FIG. 5, each FIFO is enabled by a signal EN' provided by the output of an AND gate 50 that receives the above signal EN and the signal VAL provided by the assistance circuit 48.

The addresses RA+CA generated by processor 10 are provided to the multiplexer 15 through an address folding circuit (FOLD) 52, described in detail hereinafter. Circuit 52 also receives the line MODE.

Figure 6:
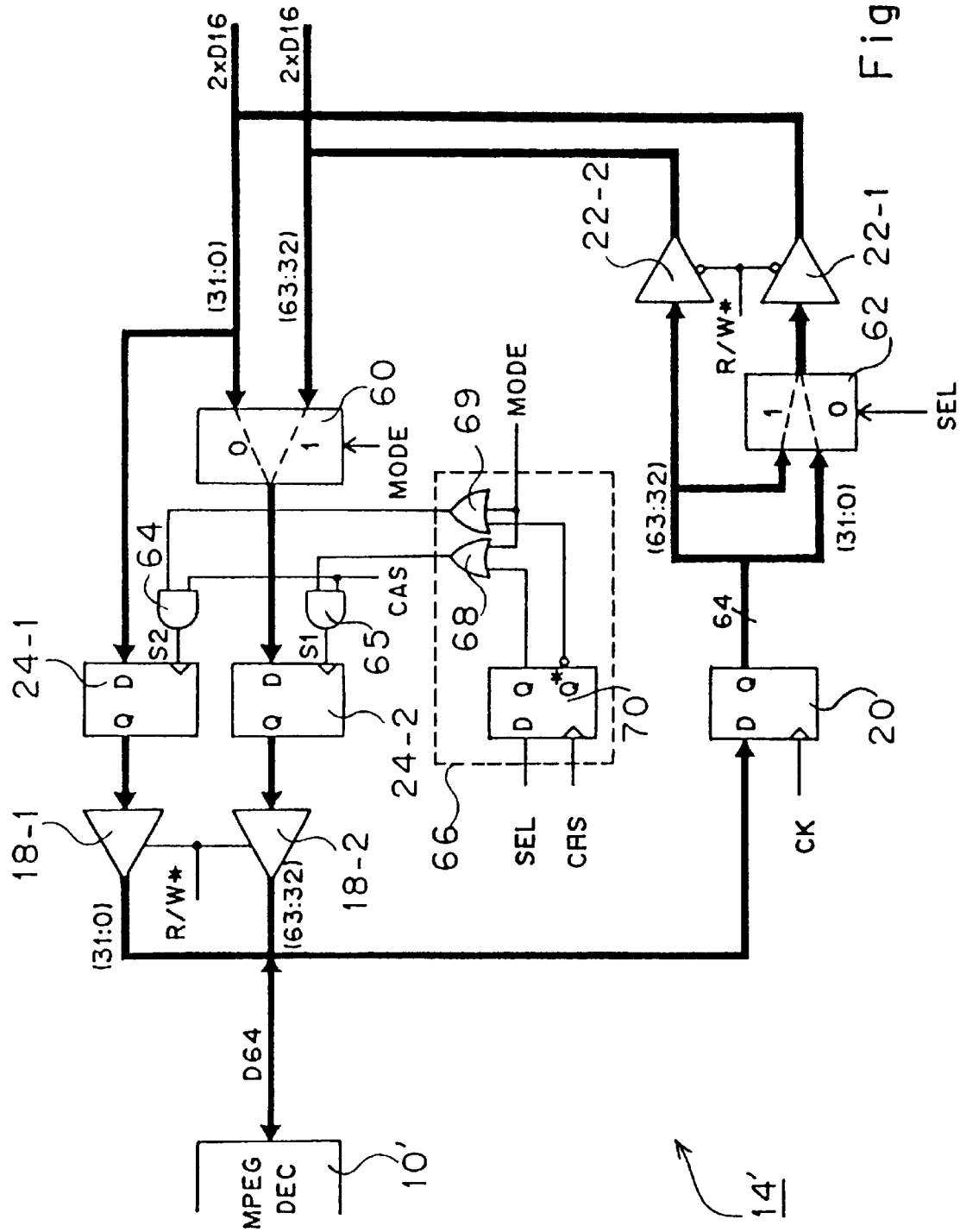
FIG. 6 represents a detailed embodiment of an interface circuit between a system bus and a memory bus according to the invention.

FIG. 6 represents a detailed embodiment of an interface circuit 14' according to the invention. The same elements as in FIG. 2 are labeled with same reference characters. The sets of the three-state gates 18 and 22 as well as the set of flip-flops 24 of FIG. 2 have each been partitioned into two sub-sets. The first sub-sets 18-1, 22-1, 24-1 are assigned to the least significant bits (0:31) of bus D64; the second sub-sets 18-2, 22-2, 24-2 are assigned to the most significant bits (32:63) of bus D64. Flip-flops 24-1 directly receive the lines from the two least significant buses D16. The lines of these least significant buses D16 are also provided to an input of a multiplexer 60 whose second input receives the lines from the two most significant buses D16. Multiplexer 60 is controlled by the line MODE and its output is provided to flip-flops 24-2. The three-state gates 22-2 directly receive the most significant output lines (32:63) from flip-flops 20. A multiplexer 62 receives at one input the most significant output lines from flip-flops 20 and at a second input the least significant output lines from flip-flops 20. The multiplexer 62 is controlled by the signal SEL mentioned with reference to FIG. 5, and its output is provided to the three-state gates 22-1.

Signal CAS is provided to the enabling inputs of flip-flops 24-1 and 24-2 through respective AND gates 64 and 65, each also receiving an output of decoder 66. Decoder 66 takes into account the state of the line MODE, and signals SEL and CAS. Decoder 66 includes OR gates 68 and 69, that are respectively connected to AND gates 65 and 64 and that receive at a first input the line MODE. A second input of the OR gate 68 receives the non-inverted output of a latch 70. The inverted output of latch 70 is provided to a second input of gate 69. The enabling input of latch 70 receives signal CAS, and the data input of latch 70 receives signal SEL.

A system according to the invention, when using a half-size memory bus (the two least significant buses D16 only), schematically operates as follows.

Advantageously, regardless of the size (full or half-size) of the memory bus, the routine executed by the processor that controls transfers of data is the same in both cases.

With a half-size memory bus, each instruction of reading or writing a data in the memory is executed twice, this instruction being normally executed once with a full size memory bus. The way in which such a double execution of a same instruction is implemented will be described below.

During each of the two executions of a same read or write instruction, the same address RA+CA is presented at the input of the folding circuit 52. One of the functions of the folding circuit 52 is to ensure that distinct addresses A are provided to the memory during each of the two executions of a same instruction, for example by multiplying address RA+CA by 2 and by adding a different least significant bit to each of the two executions of a same instruction. Thus, during each of the two executions of a same read or write instruction, different memory locations are accessed.

If the instruction to be executed twice is a memory write instruction, the data to be written is locked on bus D64 during the two executions. During the first execution, the multiplexer 62 routes (through an adequate signal SEL) the 32 most significant bits, for example, of bus D64 on the two least significant buses D16. Thus, the most significant bits of the data to be written at written at a first address. During the second execution, the multiplexer 62 routes the 32 least significant bits of bus D64 on the two least significant buses D16. Thus, the least significant data to be written are written at a second address that is distinct from the first address. Of course, steps are taken so that new data is not presented on bus D64 during the second execution. This is determined by signal VAL that prevents the FIFOs from being enabled a second time during the second execution.

When the instruction to be executed twice is a read instruction, operations opposite to those that have been described are carried out. During each of the two executions, the folding circuit 52 presents different addresses on the address bus A, so that, at the first execution, the most significant bits of data to be transmitted on bus D64 are read, and at the second execution, the least significant bits of this same data are read. Due to the multiplexer 60 and with a correct control of flip-flops 24-1 and 24-2, the most significant bits of the data that is read are presented on the most significant lines of bus D64 during the first execution, and the least significant bits of the data that is read are presented on the least significant lines of bus D64 during the second execution. Of course, a FIFO must take into account the data on bus D64 only at the second execution, which is generally determined by signal VAL that prevents, by an inactive state, the validation of the FIFOs during the first execution.

When the memory bus has a full size, the line MODE acts upon the interface circuits of FIG. 6 so that the interface is equivalent to the interface of FIG. 2. The above signal VAL is then always active and the FIFOs are enabled at each execution of a read or write instruction. In addition, the folding circuit 52 then allows addresses RA+CA to pass without modification.

Figure 7A:
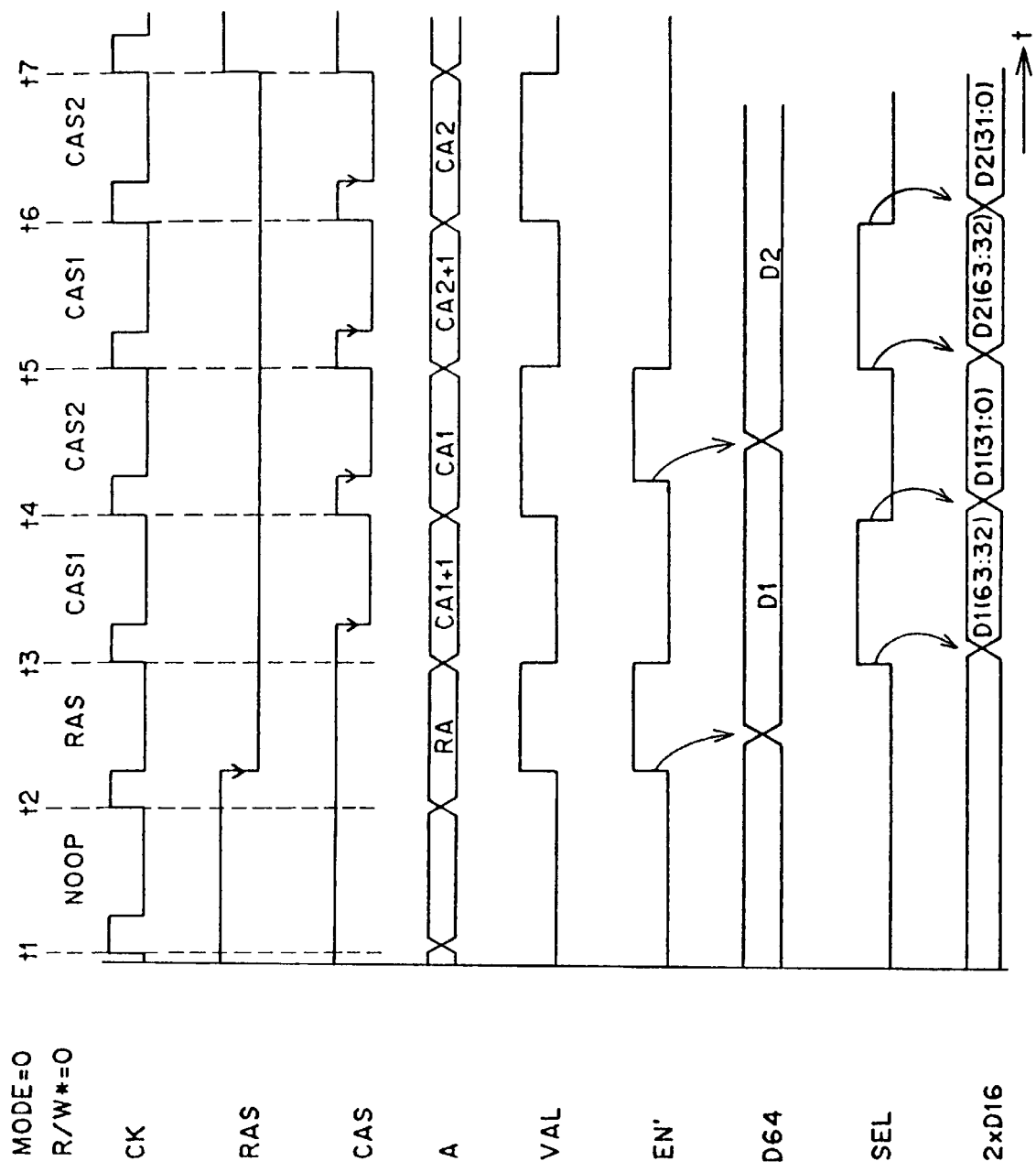

FIGS. 7A and 7B respectively illustrate a write cycle and a read cycle of two 64-bit data D1 and D2 in the memory through a memory bus having a reduced size (32 bits). These figures correspond to an example using a processor having a restricted instruction range (RISC architecture) where each instruction is executed within one clock cycle.

The line MODE is at "0" to indicate that the memory bus has a reduced size.

In FIG. 7A, corresponding to a write cycle, signal R/W* is at "0". Times t1–t7 indicate the successive rising edges of the clock signal CK. At time t1, it is desired to successively write data D1 and D2 in the memory. A non-operative cycle, NOOP, necessary for calculating the page address RA is first carried out between times t1 and t2. Between times t2 and t3, a cycle RAS, that is a page selection cycle, is carried out, during which the page address RA is presented on the address bus A. Address RA is taken into account by the dynamic memory at the falling edge of signal RAS that occurs between times t2 and t3.

During the falling edge of signal RAS, signal VAL is enabled until time t3. The active state of signal VAL allows the respective enabling signals EN' to be transmitted to the FIFOs; the FIFO enabled by the signal EN' presents data D1 on bus D64.

At time t3, a first CAS cycle, CAS1, starts, and a memory location is selected by an address CA1+1 that is presented on the address bus A. Signal VAL is disabled, which prevents the FIFOs from being enabled. Signal SEL is enabled, which causes the multiplexer 62 to be switched in order to present the most significant bits D1(63:32) of data D1 on the two least significant buses D16. These most significant bits D1(63:32) are transferred into the memory, at address CA1+1, during the falling edge of signal CAS that occurs between times t3 and t4.

At time t4, a second CAS cycle, CAS2, starts, and a new address CA1 is presented on the address bus A. Signal VAL is enabled. Signal SEL is disabled, which causes multiplexer 62 to be switched so as to present the least significant bits D1(31:0) of data D1 on the least significant buses D16. These least significant bits D1(31:0) are transferred into the memory at address CA1 upon the next falling edge of signal CAS, before time t5. During the falling edge of signal CAS, signal EN' is again enabled due to the fact that signal VAL is active, which causes the respective FIFO, that presents a new data D2 on bus D64, to be enabled.

From time t5, two new cycles CAS1 and CAS2, identical to the preceding cycles CAS, occur in order to write in the memory successively the most significant bits D2(63:32) of data D2 at address CA2+1, and the least significant bits D2(31:0) at address CA2.

FIG. 7B corresponds to the read cycle of two data D1 and D2 in the dynamic memory through a half-size bus. Signal R/W* is at "1" to indicate that a read cycle is being executed. Line MODE is still at "0". Between times t1 and t3, as in FIG. 7A, a non-operative cycle NOOP and a cycle RAS are carried out to select a page of the memory. In contrast to FIG. 7A, signal VAL (therefore signal EN') is not enabled between times t2 and t3.

At time t3 starts a first CAS cycle, CAS1, with an address CA1+1. Signal SEL is enabled. Shortly after the falling edge of signal CAS before time t4, the most significant bits D1(63:32) located at address CA1+1 are presented by the dynamic memory on the two least significant buses D16.

At time t4, starts a second CAS cycle, CAS2, with an adddress CA1. Signal SEL is disabled, which causes the output S1 of gate 65 to be enabled. The activation of signal S1 locks on the most significant lines of bus D64 the bits D1(63:32). Shortly after a new falling edge of signal CAS before time t5, the least significant bits D1(31:0) located at address CA1 appear on the two least significant buses D16.

At time t5 start, for example, two new read cycles CAS1 and CAS2 of a new data D2 on bus D64. Signal SEL is again enabled and signal VAL is enabled for the first time. The activation of signal SEL causes the output S2 of gate 64 to be enabled. The flip-flops 24-1 then lock on the least significant lines of bus D64 the least significant bits D1(31:0) present on the two buses D16. The complete data D1, that is the 64-bit data, is then present on bus D64. Once signal VAL is enabled, signal EN' corresponding to one of the FIFOs 10-1 is enabled, which allows FIFO 10-1 to take into account the data D1 present on bus D64.

Figure 8A:
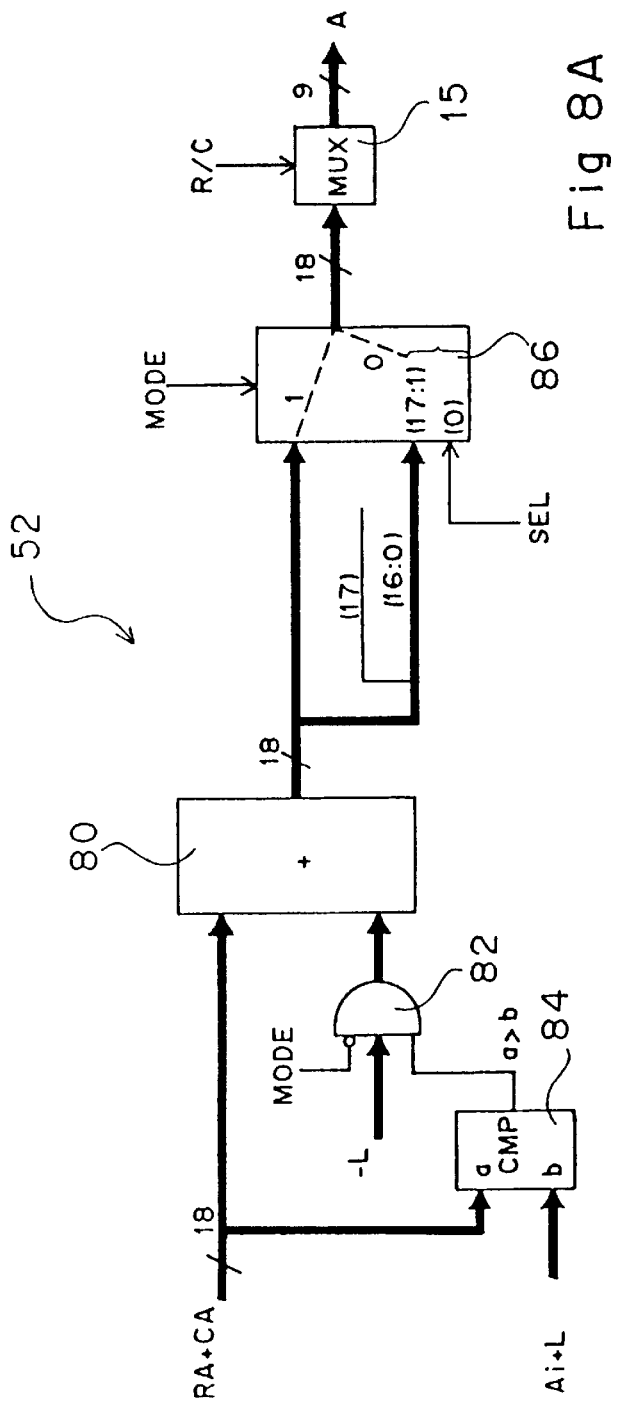
FIGS. 8A and 8B represent embodiments of an address folding circuit and of a circuit for controlling the filling of the memory in an architecture according to the invention.

FIG. 8A represents a detailed embodiment of the address folding circuit 52. Circuit 52 serves to adapt the addresses RA+CA transmitted by the processor to normally access a 16-Mbit memory at addresses serving to access a 8-Mbit memory structured according to FIG. 3.

To achieve this purpose, a first function of the folding circuit 52 is to provide addresses starting at address Ai of the beginning of the image buffer IB1 when the addresses RA+CA provided by the processor 10' exceed the address Ai+L indicating the end of the half buffer ½IB (L being the length of the set of buffers IB1 and ½IB).

A second function of the folding circuit 52 is to generate distinct addresses at each execution of a read or write instruction.

A first portion of the circuit includes an adder 80 receiving at a first input the address RA+CA provided by the processor. A second input of adder 80 receives the value –L if an AND gate 82 is conductive. One of the inputs of the AND gate 82 receives the inverse value of the line MODE. A second input receives the output a>b of a comparator 84. An input a of comparator 84 receives the address RA+CA and an input b receives the address Ai+L. Thus, if the line MODE is at "0" (half-size memory bus), the output of adder 80 is RA+CA if RA+CA is lower than Ai+L, and RA+CA-L otherwise.

Since the decoding system only uses intra and direct predicted codings, the processor only provides RA+CA addresses that correspond to two input buffers, that is, these addresses never exceed Ai+2L, in contrast to the case of a complete system with three input buffers where these addresses reach Ai+3L.

Thus, the folding circuit 52 generates addresses usable with a 8-Mbit memory structured according to FIG. 3 whereas these addresses are normally generated for 12 Mbits of a 16-Mbit memory.

A second portion of the folding circuit 52 includes a multiplexer 86 receiving, at one input, the output of adder 80 and, at the bits of weight 1–17 of a second input, the bits of weight 0–16 of the output of adder 80, the bit of weight 0 of this second input being connected to signal SEL. The multiplexer 86 is controlled by the line MODE and its output is connected to the multiplexer 15 providing address A. When line MODE is at "0" (memory bus with a reduced size), the multiplexer 86 selects its second input that corresponds, with the represented configuration, to the output value of adder 80 multiplied by 2, the least significant bit being replaced by the value of signal SEL. Since signal SEL is at "1", in FIGS. 7A and 7B, at each cycle CAS1 and at "0" at each cycle CAS2, the addresses presented on the bus during cycles CAS1 are, as indicated, higher by 1 than the addresses presented during cycles CAS2.

Thus, the folding circuit 52 generates addresses that can be used with a memory bus having a reduced size whereas these addresses are normally generated for a memory bus having a complete size.

Figure 8B:
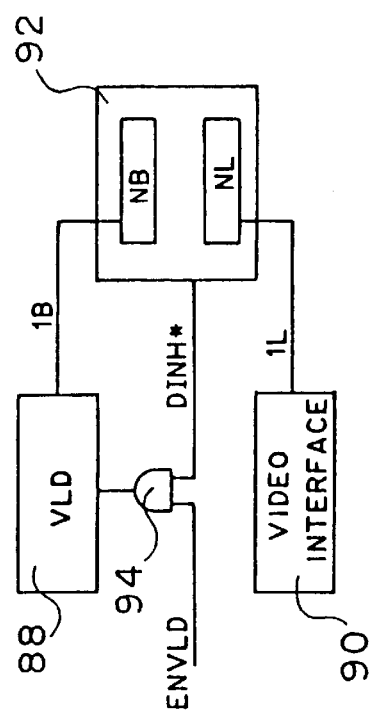

FIG. 8B schematically represents an embodiment of a circuit that prevents an image being reconstructed from overwriting a portion of a preceding image, not yet displayed.

An MPEG decoder conventionally includes a variable length decoder (VLD) 88 and a video interface 90. The VLD receives the stored information that is stored in field CD of the memory and provides a pulse 1B each time the VLD decodes data corresponding to a block of an image being reconstructed. The video interface 90 receives data of an image being displayed and provides a pulse 1L each time an image line has just been displayed. The VLD is normally enabled through a signal ENVLD.

According to the invention, a control circuit 92 receives pulses 1B and 1L and provides a decoding inhibition signal DINH* whose active state (0) prevents signal ENVLD from reaching the VLD, for example by combining these two signals through an AND gate 94. The control circuit 92 includes, for example, a counter NB that counts the number of pulses 1B (the number of decoded blocks) and that is reset when the number of decoded blocks corresponds to a full image. A second counter NL counts the number of pulses 1L (the number of displayed lines) and is reset when the number of the displayed lines corresponds to a full image. Hereinafter, NB and NL also designate the respective contents of counters NB and NL.

There are two so-called "progressive" and "interleaved" display modes. According to the progressive mode, even and odd lines are successively displayed and, according to the interleaved mode, the odd lines are first displayed, then the even lines are displayed.

In the exemplary description given below, each image comprises 720×480 pixels and each block contains 16×16 pixels. Thus, there are 1,350 blocks for each image and a line has a 45-block width.

In the progressive display mode, the image buffer that stores the image to be displayed is linearly emptied. Thus, the control circuit 92 merely has to enable the inhibition signal DINH* each time that the number of decoded blocks NB reaches the number of blocks corresponding to a half image (675) plus the number of lines corresponding to the lines that are displayed (45int[NL/16], where "int[. . . ]" means "integer part of . . . "). Thus, DINH* is enabled if $$NB > 675 + 45 \text{ int}[NL/16].$$

In the interleaved mode, the image buffer containing the image being displayed is first emptied of the odd lines, for example, and then of the even lines. Thus, in a first phase, as long as the number of displayed lines does not correspond to a half image (NL<240), signal DINH* is enabled each time the number of decoded blocks reaches the number of blocks corresponding to a half image (NB>675). In a second phase, when the number of lines displayed corresponds to more than a half image (NL>240), signal DINH* is enabled each time the number of the decoded blocks reaches the number of blocks corresponding to a half image plus the number of blocks corresponding to the even lines that are displayed. To know the number of the displayed even lines, the number of odd lines in an image (240) is subtracted from the total number of the displayed lines NL. Thus, DINH* is enabled in this second phase if $$NB > 675 + 45 \text{ int}[(NL-240)/8].$$

The control circuit 92 can be easily fabricated by those skilled in the art with counters, adders and comparators.

Figure 9A:
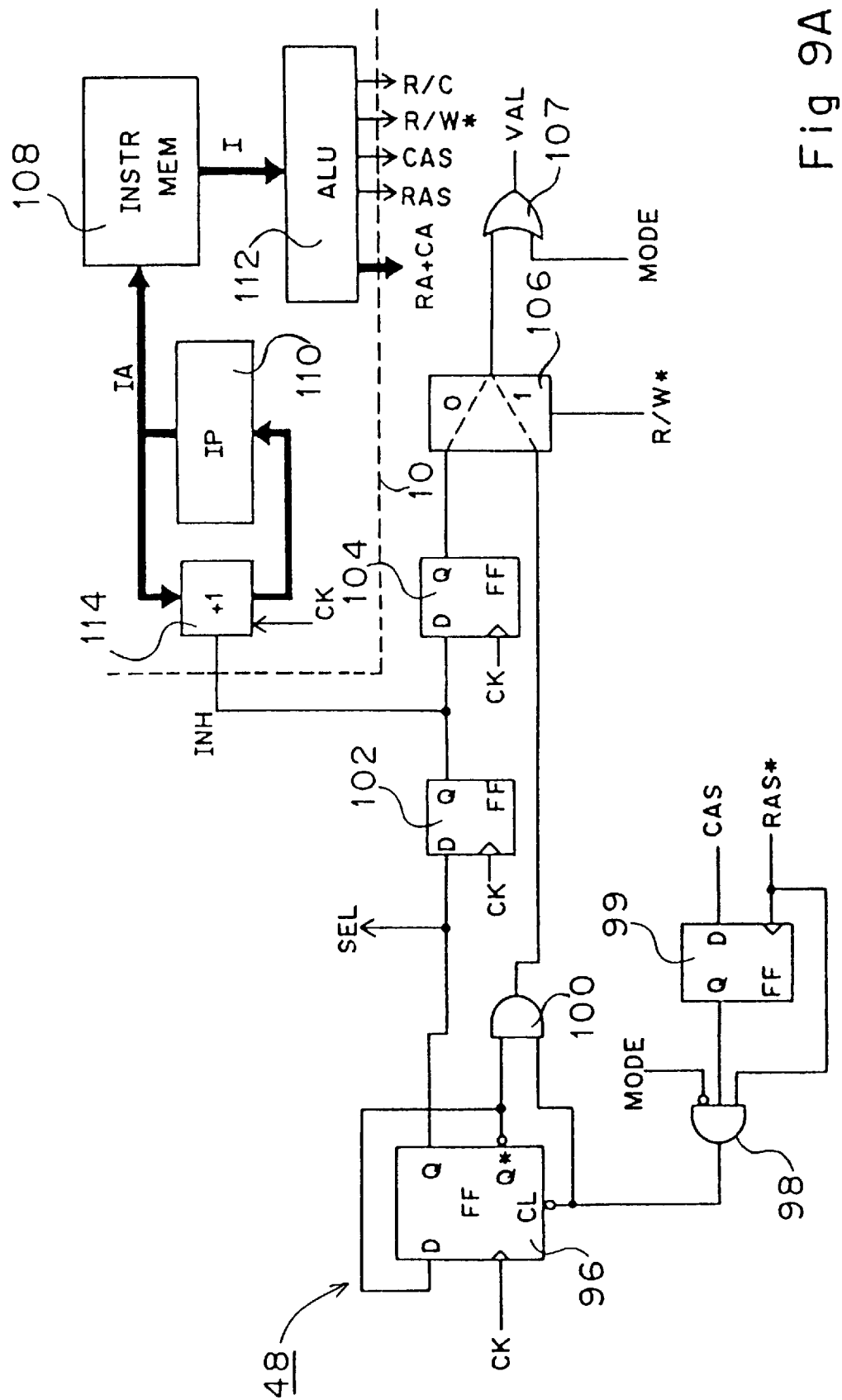
FIG. 9A represents an embodiment of an assistance circuit providing various signals that are necessary for an architecture according to the invention and, partially, an exemplary processor architecture modified according to the invention.

FIG. 9A represents an embodiment of an assistance circuit 48. Circuit 48 includes a flip-flop 96 whose inverted output Q* is connected to the data input thereof. The clock input of flip-flop 96 receives the clock signal CK; a clear input CL that is active at "0" receives the output of an AND gate 98. With this configuration, as soon as input CL is disabled (at "1"), flip-flop 96 is "released" and acts as a divider by 2 for halving the frequency of clock CK.

The gate 98 receives the output of a flip-flop 99 and the complement, RAS*, of signal RAS, as well as the complement of line MODE. The data input of flip-flop 99 receives signal CAS and the clock input receives signal RAS*. With this architecture, if line MODE is at "0" (which is the case of the memory bus with a reduced size), flip-flop 96 is released only during a read or write cycle (thus, one eliminates the release of flip-flop 96 that would also occur during a refreshment cycle of the memory, when signal RAS is also enabled, but after signal CAS).

The output Q* of flip-flop 96 is connected to a first input of an AND gate 100. The output of gate 98 is connected to a second input of gate 100. When line MODE is at "0", the output Q of flip-flop 96 provides the signal SEL and the output of gate 100 provides the signal VAL of FIG. 7A (write cycles in the memory). The signal VAL of FIG. 7B (for read cycles of the memory) is shifted by three clock cycles with respect to the signal VAL of FIG. 7A. The signal SEL is shifted by one clock cycle with respect to the signal VAL of FIG. 7A. Thus, the signal VAL of FIG. 7B is provided by delaying the signal SEL by two clock cycles through two flip-flops 102 and 104 that are cascade disposed at the output Q of flip-flop 96. The adequate signal VAL is selected by a multiplexer 106 that receives the output of flip-flop 104 and the output of gate 100 and that is controlled by the signal R/W*. An OR gate 107 receives the line MODE and the output of multiplexer 106 so that the signal VAL is always active when the complete memory bus is used.

FIG. 9A also shows some of the components of a conventional processor that processes the write or read instructions of the memory. The processor includes an instruction memory 108 containing a program normally intended for an MPEG decoding system that is provided with a 16-Mbit memory. An instruction pointer 110 provides the address IA of the instruction I being executed. Instruction I is provided by memory 108 to a processing unit (ALU) 112 that generates address RA+CA and signals RAS, CAS, R/W* and R/C. The instruction pointer 110 is incremented at each clock cycle by an adder 114. Thus, at each clock signal CK, a new instruction to be executed in processor 112 is fetched in memory 108.

According to an embodiment of the invention, adder 114 is inhibited by a signal INH provided by the output of flip-flop 102. Signal INH is active during each cycle CAS2 of FIGS. 7A and 7B. Thus, after each execution of a first read or write instruction (CAS1), the instruction pointer is prevented from being incremented during the next clock cycle, whereby the same read or write instruction is always executed during the next cycle. Of course, the second time this instruction is executed, address RA+CA is normally not modified. The folding circuit 52 operates to generate distinct addresses during each of the two executions of the same read or write instruction.

Figure 9B:
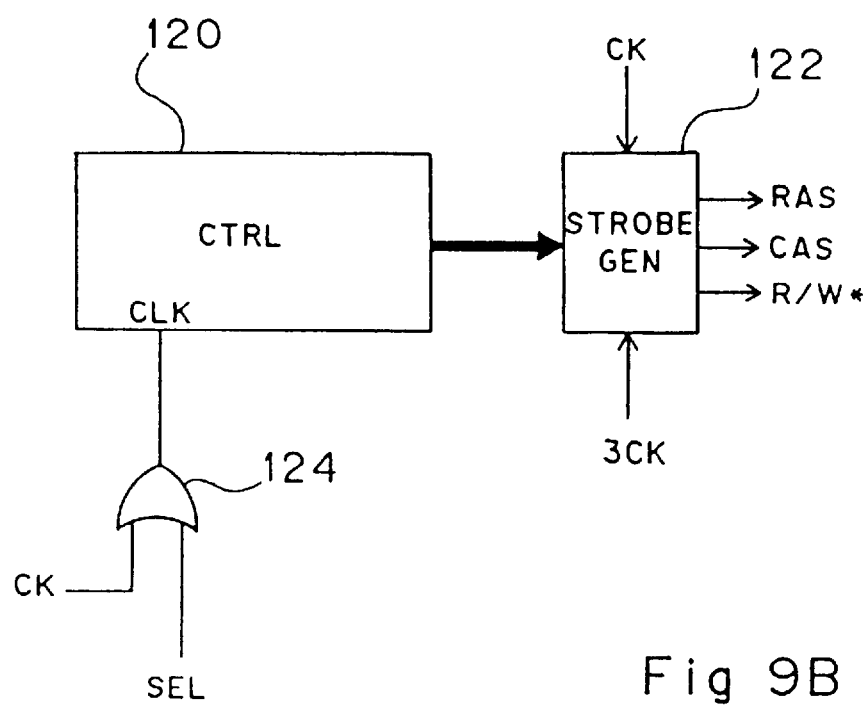
FIG. 9B partially represents an alternative exemple of a modified processor architecture according to the invention.

FIG. 9B represents an alternative architecture of a processor allowing a particularly simple modification to achieve the two executions of each read or write instruction. This processor includes a control unit 120 that incorporates the instruction pointer 110, the instruction memory 108, the adder 114, as well as a portion of the processing unit 112 of FIG. 9A. Signals RAS, CAS and R/W* are generated by a unit 122 from the clock signal CK, a triple-frequency clock signal 3CK, and a control signal provided by unit 120. This control signal directly corresponds to an instruction loaded for execution in unit 120.

Normally, the control unit 120 receives the clock signal CK at an input CLK. According to an embodiment of the invention, an OR gate 124 receiving signals CK and SEL is disposed at the clock input CLK of unit 120. With this configuration, the control unit 120 is "frozen" each time signal SEL is active, whereas signals RAS and CAS are transmitted normally. If a read or write instruction is loaded in unit 120, this instruction is not replaced by the next one as long as signal SEL is active (during each of the first cycles CAS of FIGS. 7A and 7B). Since unit 122 receives unmodified clock signals CK, 3CK, the operations of unit 122 are repeated at each clock cycle as long as the loaded instruction is maintained.

This embodiment is particularly simple to implement because the clock input of unit 120, before which the OR gate 124 must be disposed, is easily accessible.

In the above, advantageous embodiments of the invention have been described, which, with simple modifications of a conventional architecture, provide a single transfer program of data, regardless of whether the architecture is used with a full memory bus or a reduced memory bus. Of course, it is also possible, if it is not desired to use a folding circuit 52 and the inhibition function of the instruction pointer 110 or of clock CK, to provide two distinct programs depending on whether the architecture is used with a full memory bus or a reduced memory bus.

The exemplary operation described with relation to FIGS. 7A and 7B corresponds to a RISC architecture processor, that is, each clock cycle corresponds to the execution of one instruction. Such an architecture allows to carry out several successive CAS cycles after a RAS cycle. With a complex instruction set circuit (CISC), a read or write instruction corresponds at least to the assembly of cycles NOOP, RAS and CAS. When a read or write instruction is to be executed twice in such an architecture, the sequence of cycles NOOP, RAS and CAS is executed twice. Those skilled in the art will be able to determine the waveforms of the corresponding signals VAL, INH and SEL and to generate these signals. To achieve this purpose, for example, the circuit of FIG. 9 is provided with pulses CK that correspond to instruction cycles and not to clock cycles.

The circuits of FIGS. 6, 8A, 8B, 9A, and 9B are given by way of example. They will be easily achieved by those skilled in the art by using the described functions of these circuits, in various manners.

The present invention has been described in connection with the use of an MPEG decoder, but it should be noted that the invention applies to any processor system incorporating a fixed size system bus and a variable size memory bus, the size of the memory being not taken into account.

Indeed, assuming that the size of the memory bus is $n=2^p$, and that the size of the system bus is $N=2^P$, instead of using a single line MODE and a single signal SEL, several lines MODE and several lines SEL are used.

In the embodiment of FIG. 9A, the signal INH that allows to inhibit the incrementation of the instruction counter IP, remains active during $(N/n)-1$ read or write cycles so that a same read or write instruction is executed $N/n$ times.

The addresses RA+CA provided by the processor are multiplied by $N/n$ in the folding circuit and the least significant bits of these addresses are replaced with the states of lines SEL, so as to use a different address at each execution of a same read or write instruction.

According to an embodiment of the invention, the interface circuit between the system bus and the memory bus includes two shift registers, namely, a memory write register, and a memory read register.

The write shift register receives the N lines of the system bus (D64) and feeds the N lines of the memory bus (the four buses D16). The write shift register is programmable by the bus MODE to shift n bits to the right at each clock cycle. Thus, the N/n successive sub-words of n bits of the word present on the system bus are presented on the useful (least significant) lines of the memory bus.

The read shift register receives the N lines of the memory bus and feeds the N lines of the system bus. The read shift register is programmable by the bus MODE to shift n bits to the left at each clock cycle. Thus, at the end of N/n cycles, the shift register contains the word of N bits to be read. Sub-words must be read in the reverse order they were written.

Figure 10A:
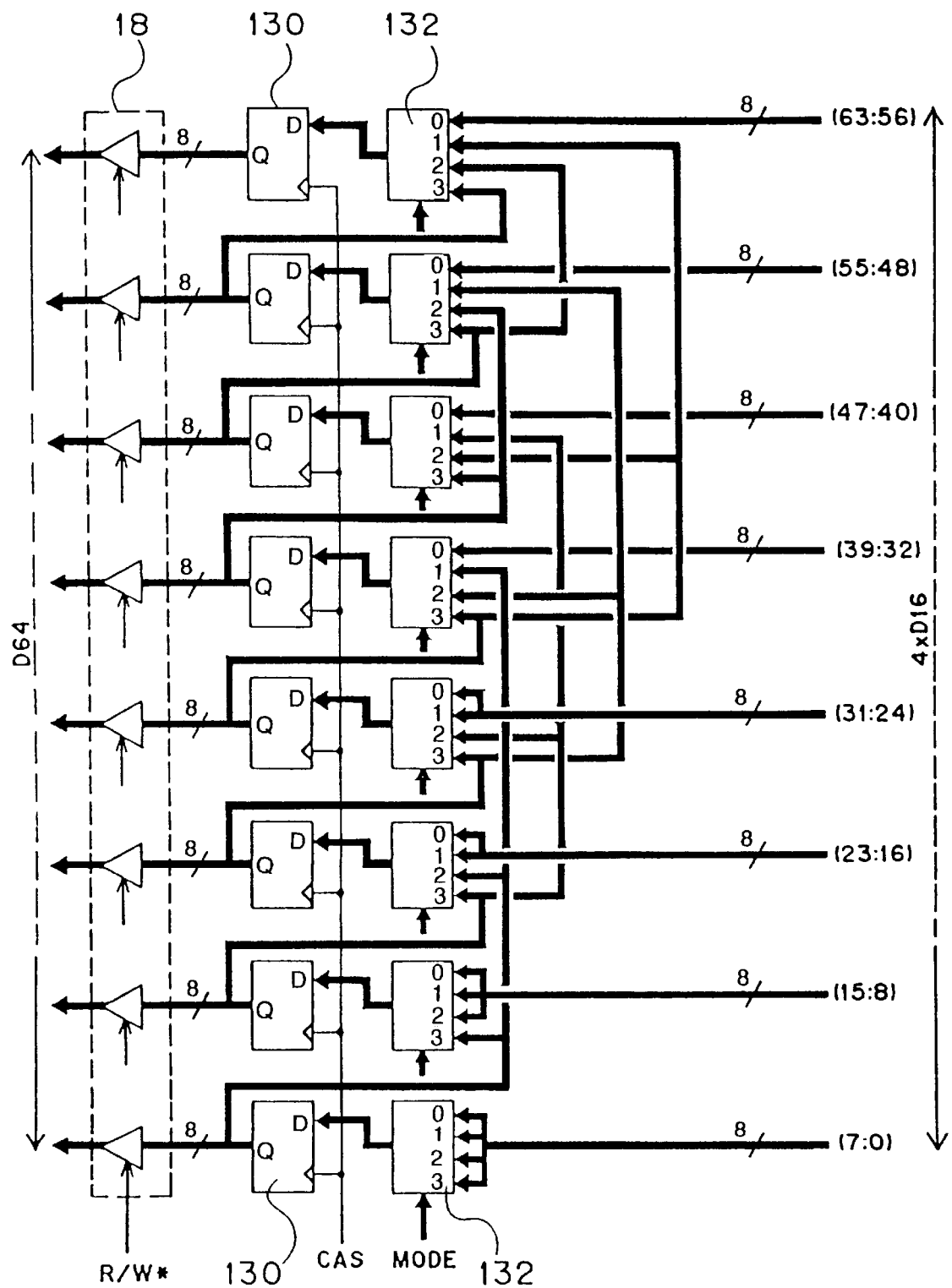
FIGS. 10A and 10B represent an alternative embodiment of the interface circuit according to the invention, adapted to a memory bus that can have four different sizes.
Figure 10B:
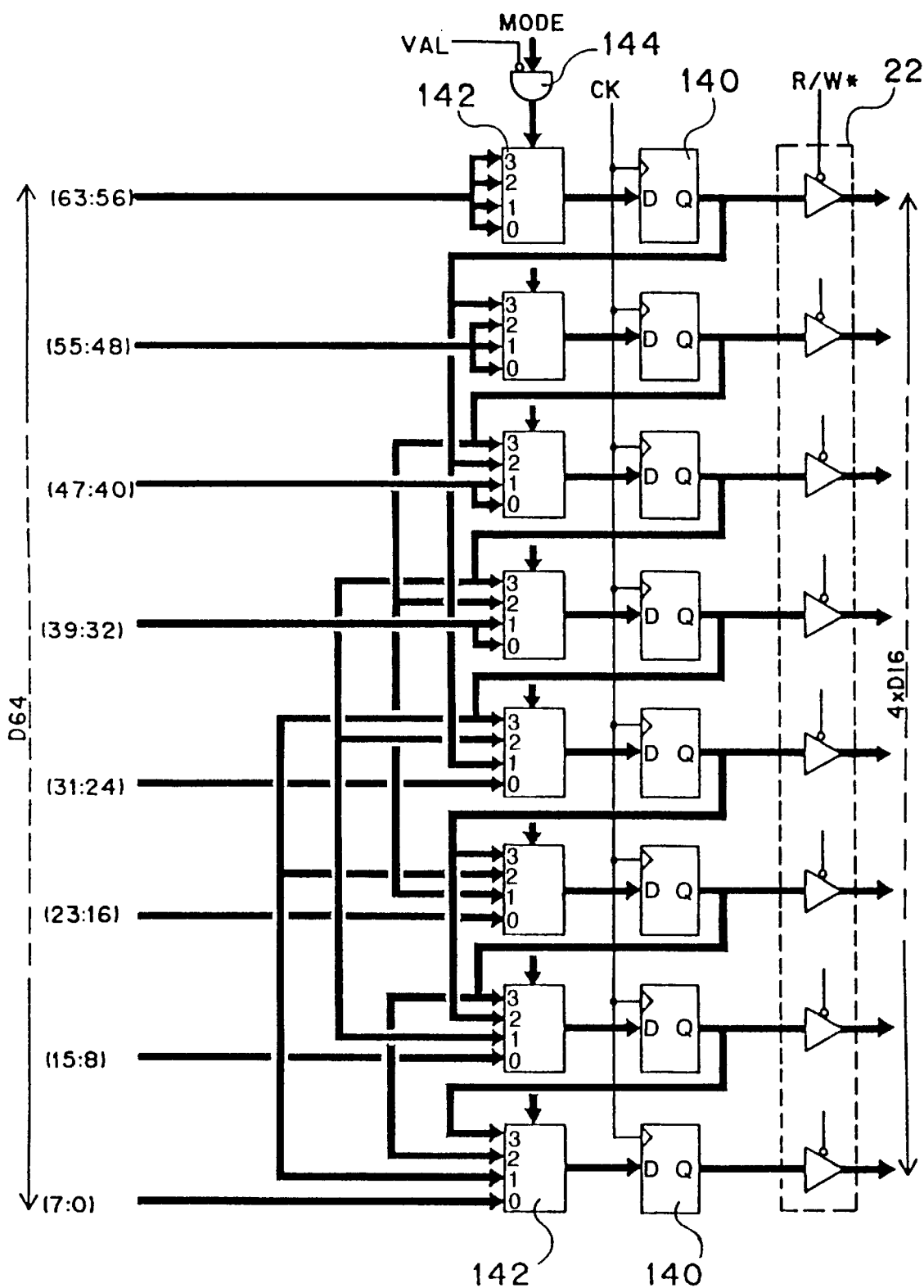

FIGS. 10A and 10B show such a shift register interface in the example where the system bus, D64, is a 64-line bus system and where the size of the memory bus can be selected among 64, 32, 16 and 8 lines. To select these four possibilities, a 2-line bus MODE is used.

The following table sums up the choices of the sizes of the memory bus as a function of the values presented on bus MODE.

| MODE(1:0) | SIZE OF THE MEMORY BUS |
| --- | --- |
| 00 | 64 bits |
| 01 | 32 bits |
| 10 | 16 bits |
| 11 | 8 bits |

FIG. 10A represents an embodiment of a memory read shift register. This shift register includes eight 8-bit flip-flops 130. As with the flip-flops 24 of FIG. 2, the outputs of flip-flops 130 are connected to bus D64 through a set of 3-state gates 18, and the clock inputs of flip-flops 130 receive signal CAS.

The data input of each flip-flop 130 is connected to the output of a respective four-input multiplexer 132. Multiplexers 132 are controlled by the bus MODE. The commonly selected input of a multiplexer 132 is indicated by the decimal value (0,1,2,3) present on the bus MODE. The inputs 0 of the eight multiplexers 132 respectively receive the eight sets of 8 lines of the memory bus 4xD16.

A parameter, hereinafter referred to as rank i, is the parameter associated with the lines of weight i−1 to i+6 of the memory bus or system.

The flip-flops 130 and multiplexers 132 are recursively interconnected as follows: the output of a flip-flop 130 of rank i is connected to the input 3 of the multiplexer of rank i+1, to the input 2 of the multiplexer of rank i+2 and to the input 1 of the multiplexer of rank i+4. All the inputs of the multiplexer of rank 1 are interconnected, the inputs 0 to 2 of the multiplexer of rank 2 are interconnected, and the inputs 0 and 1 of the multiplexers of ranks 3 and 4 are interconnected. Of course, the multiplexer of rank 1 can be eliminated, but it is represented to show out the regularity of the connections.

With this configuration, a shift register for shifting to the left 0, 8, 16 or 32 bits depending on the value present on the bus MODE is achieved.

FIG. 10B represents an embodiment of a memory write shift register. The write register includes eight 8-bit flip-flops 140 associated with the eight sets of eight lines of bus D64, respectively. Like the flip-flops 20 of FIG. 2, the outputs of flip-flops 140 are connected to the lines of the memory bus 4xD16 through a set of 3-state gates 22, and the clock inputs of flip-flops 140 receive the clock signal CK.

The data input of each flip-flop 140 is connected to the output of a respective "4 to 1" multiplexer 142. Multiplexers 142 are controlled by the bus MODE through an AND gate 144 also receiving the complement of signal VAL. With this configuration, when the signal VAL is active (at 1) the input 0 of each multiplexer 142 is selected, independently of the state of the bus MODE. When the signal VAL is inactive, the input corresponding to the value of the bus MODE is selected in each multiplexer.

Multiplexers 142 and flip-flops 140 are connected together in the same manner as the flip-flops of FIG. 10A, except that the ranks associated with each multiplexer/flip-flop pair are reverse-connected with respect to those of FIG. 10A.

With this configuration, a shift register for shifting to the right 0, 8, 16 or 32 bits depending on the value present on bus MODE is realized. In addition, all the inputs 0 of the multiplexers 142 are selected when the signal VAL is active, which causes the 64-bits data presented on bus D64 at the beginning of a write cycle in the memory to be stored in flip-flops 140.

Figure 11:
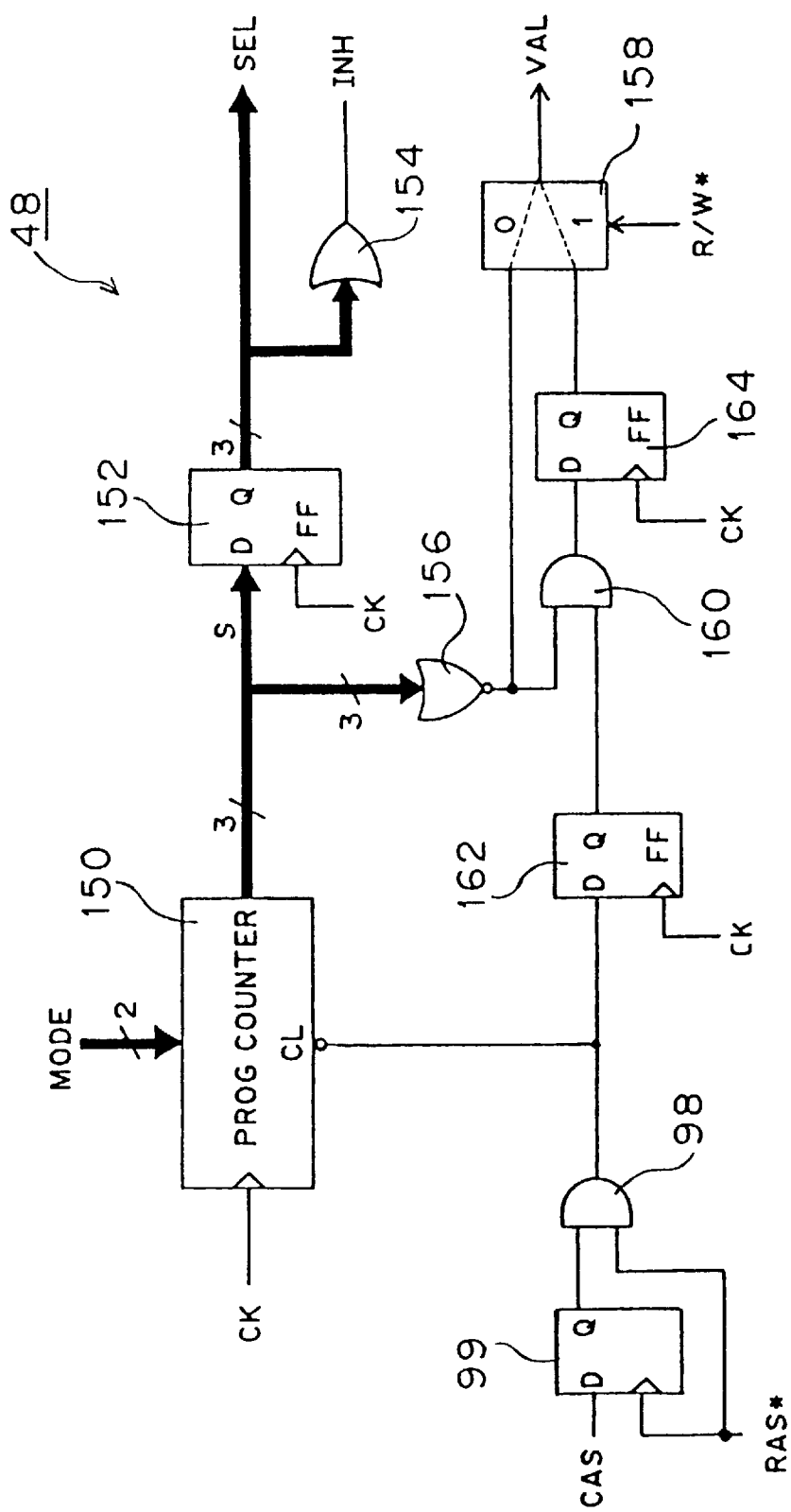
FIG. 11 represents an alternative embodiment of the assistance circuit according to the invention.

FIG. 11 represents an embodiment of an assistance circuit 48 intended to generate the various signals of the above system, in which the memory bus can have four different sizes. FIG. 11 shows again the AND gate 98 and the flip-flop 99 of FIG. 9A, that are connected in the same manner, except that the AND gate 98 does not receive the line MODE. The output of gate 98 is connected to a reverse reset input of a programmable counter 150, so that the counter 150 is released only when signal RAS is active (at 0) during a read or write cycle.

Counter 150 is clocked by the clock signal CK and is programmable by the bus MODE to remain at 0, or to count up to 2, 4 or 8 depending on the value present on the bus MODE. The 3-bits output S of counter 150 is delayed by one clock cycle through a flip-flop 152 prior to being provided to three lines of a bus SEL. With this configuration, the value present on the bus SEL is 0 during a first cycle CAS and is incremented at each following cycle CAS of a repeated execution of a same read or write instruction. Signal INH mentioned with relation to FIG. 9A is provided at the output of an OR gate 154 receiving the three lines of bus SEL. Thus, signal INH is active (that is, when it prevents a new instruction from being loaded in the processor) during each cycle CAS, except for the first one, of a repeated execution of a same read or write instruction. In the example of FIG. 9B, all the lines of bus SEL are provided to the OR gate 124.

The three lines S are also provided to a NOR gate 156. The output of the NOR gate is at "1" during the clock cycle preceding each first cycle CAS of a repeated execution of a read or write instruction. The output of gate 156 therefore corresponds to the signal VAL to be provided during a write cycle in the memory. Signal VAL is selected by a first position of a multiplexer 158 controlled by line R/W*.

The output of gate 156 is also provided to a first input of an AND gate 160 whose second input receives the output of gate 98 delayed by one clock cycle through a flip-flop 162. The output of gate 160 is delayed by one clock cycle through a flip-flop 164. Thus, the output of flip-flop 164 is at "1" during the clock cycle following the last cycle CAS of a repeated execution of a same read or write instruction. The output of flip-flop 164 therefore corresponds to the signal VAL to be provided during a read cycle in the memory and is provided to a second input of multiplexer 158.

Figure 12:
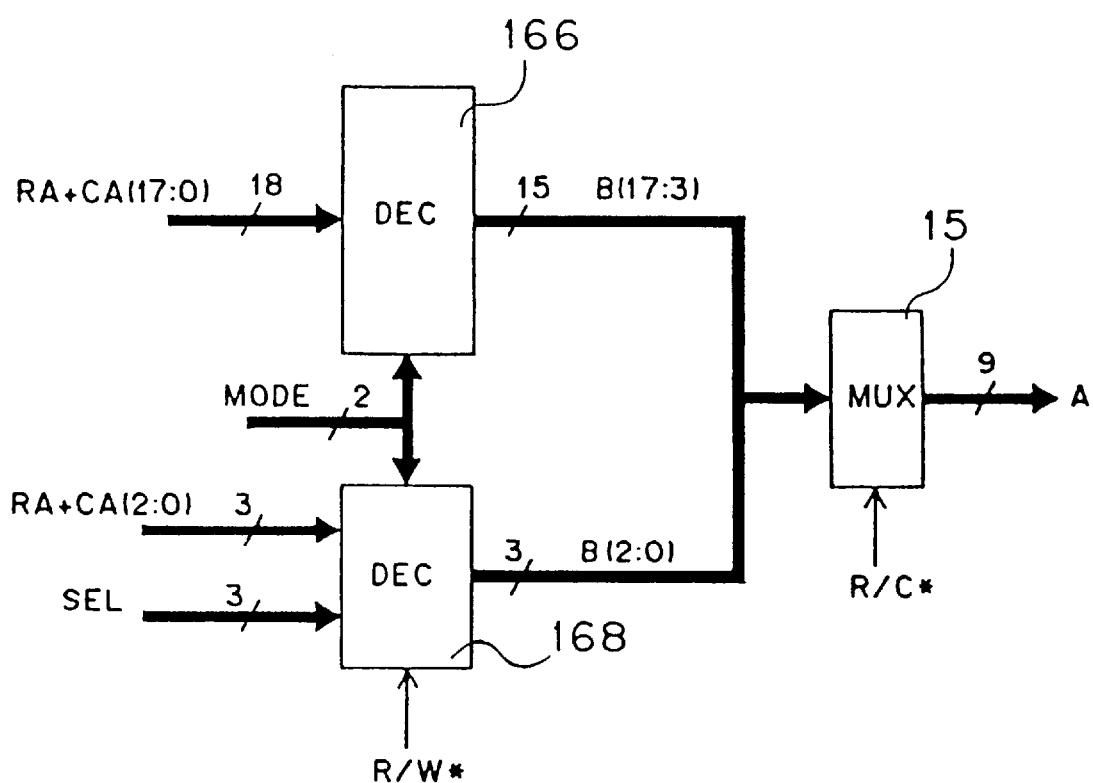
FIG. 12 represents an alternative embodiment of the address folding circuit according to the invention.

FIG. 12 represents an embodiment of a modification circuit for modifying addresses A to be provided to the memory during repeated executions of a same read or write instruction. The 18 bits (17:0) of the adddress RA+CA generated by the processor are provided to the input of a first decoder 166. Decoder 166 provides the 15 most significant bits (17:3) of a 18-bit address B provided to the above multiplexer 15. A second decoder 168 receives the three least significant bits (2:0) of address RA+CA, the three lines SEL and line R/W*. The decoder 168 provides the three least significant bits (2:0) of address B. Each decoder 166 and 168 also receives the two lines of the bus MODE. The following table shows the output values of decoders 166 and 168 as a function of the values of the bus MODE.

| MODE | B(17:3) | B(2:0), R/W* = 0 | B(2:0), R/W* = 1 |
|---|---|---|---|
| 00 | RA + CA(17:3) | | RA + CA(2:0) |
| 01 | RA + CA(16:2) | RA + CA(1:0):SEL*(0) | RA + CA(1:0):SEL(0) |
| 10 | RA + CA(15:1) | RA + CA(0):SEL*(1:0) | RA + CA(0):SEL(1:0) |
| 11 | RA + CA(14:0) | SEL*(2:0) | SEL(2:0) |

In the above table, notation RA+CA(0):SEL*(1:0), for example, in the third column indicates that the three least significant bits (2:0) of address B are equal, by decreasing order of weight, to the least significant bit of address RA+CA and to the two least significant reverse bits of bus SEL.

It should be noted in the above table that when line R/W* is at "0" (write cycle in the memory) the complement of lines SEL is used whereas lines SEL are directly used when line R/W* is at "1" (read cycle in the memory). With this configuration, the sub-words of a 64-bit word that are written in the memory by a reduced size memory bus are read again in the reverse order they were written, which is made necessary, as above mentioned, if a shift register interface is used.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

What is claimed is:

1. An image processing system including an image processor adapted to process images according to intra, predicted and bidirectional modes, in cooperation with a memory capable of storing at least three decoded images and accessible through an N-bit data bus, and adapted to process images only according to intra and predicted modes in cooperation with a half-size memory through an N/2-bit bus, said image processing system comprising:

means for, at each execution by the processor of a write instruction of one N-bit word to the half-size memory, successively writing each N/2-bit sub-word of the N-bit word;

means for, at each execution of a read instruction of an N-bit word from the half-size memory, successively reading in said half-size memory two N/2-bit sub-words, and juxtaposing these subwords on the N-bit bus;

an addressing circuit for providing the half-size memory with two distinct addresses for each address provided by the processor;

an address folding circuit for providing an address within the address boundaries of the half-size memory when an address provided by the addressing means is out of the boundaries; and means for stopping the processor if an address provided to the half-size memory in write mode corresponds to data which has not yet been read.

2. The system of claim 1, including means for locking each read and write instruction in the processor, so that a same read and write instruction is executed twice.

3. The system of claim 2, wherein said locking means include means for inhibiting the incrementation of an instruction pointer of the processor.

4. The system of claim 2, wherein said locking means include means for inhibiting the provision of a clock signal to the processor.

5. The system of claim 2, wherein said addressing circuit includes means for multiplying each address provided by the processor by two and for incrementing the resulting address after the first execution of the same read and write instructions.

6. The system of claim 2, further comprising:

devices that are connected in order to recieve N-bit data from the N-bit bus through activation of respective enabling signals, each signal being normally activated at each execution of a read instruction, and means for authorizing the activation of said enabling signals only during the execution of the second of two same read instructions.

7. The system of claim 2, further comprising:

devices that are connected to write N-bit data on the N-bit bus through activation of respective enabling signals, each signal being normally activated each time a write instruction is executed, and means for authorizing the activation of said enabling signals only during the execution of the first of two same write instructions.

8. A processing system for decoding images encoded in accordance with intra and predicted modes standard, said system comprising:

a memory having an image field;

a processor for decoding said images and for storing and retrieving data of decoded images in said memory, said processor providing first addresses for storing and retrieving said data which include addresses which are larger than said image field; and address adjusting means for converting said first addresses to second addresses which are within said image field.

9. The processing system of claim 8, wherein said address adjusting means determines said second addresses such that said data are stored in a portion of said memory having data which have been displayed.

10. The processing system of claim 9, further comprising processor control means for controlling operation of said processor such that decoded data to be stored in said memory are not stored over data in said memory which have not been displayed.

11. The processing system of claim 8 wherein said address adjusting means includes:

address generating means for generating a plurality of said second addresses corresponding to each first address;

data division means for separating said decoded data into a plurality of subportions corresponding to said plurality of second addresses, and for storing said subportions of data at respective second addresses in said memory when data are to be stored in said memory; and data combination means for retrieving subportions of data corresponding to said plurality of second addresses from said memory and for combining said retrieved subportions of data to form said decoded data.

12. The processing system of claim 11, wherein said data division means includes a shift register.

13. The processing system of claim 11, wherein said data combination means includes a shift register.

14. The processing system of claim 10, wherein said processor control means includes:

line counting means for determining the number of lines of a first image which have been displayed;

block counting means for determining the number of blocks of an second image which have been decoded; and comparator means for inhibiting operation of said processor when said number of blocks exceeds a certain number proportional to said number of lines.

15. The processing system of claim 14, wherein images are displayed in a progressive display mode, wherein said image field is the size of one and a half images, and wherein said certain number is $$\tfrac{1}{2} IB + WB * \text{int}[NL/BH]$$

where IB is the number of blocks in an images WB is the number of blocks across an image, NL is the number of lines which have been displayed, and BH is the number of lines in a block.

16. The processing system of claim 14, wherein images are displayed in a interleaved display mode, wherein said image field is the size of one and a half images, and wherein said certain number is $$\tfrac{1}{2} IB + WB * [(NL - ODD)/(\tfrac{1}{2} BH)]$$

where IB is the number of blocks in an image, WB is the number of blocks across an image, NL is the number of lines which have been displayed, ODD is the number of odd lines in an image, and BH is the number of lines in a block.

17. A method for decoding and displaying images encoded in accordance with intra and predicted modes standard, said method comprising the steps of:

decoding said images to produce image data;

generating first addresses for storing said image data;

adjusting said first addresses to create a second addresses for storing said image data; and storing said image data in a memory at locations corresponding to said second addresses.

18. The method of claim 17, further comprising the steps of:

generating said first addresses for retrieving said image data;

adjusting said first addresses to create said second addresses for retrieving said image data;

retrieving said data from said second addressees in said second memory; and displaying said image data.

19. The method of claim 18, wherein said first addresses are adjusted such that said image data are stored in a portion of said memory having data which has been displayed.

20. The method of claim 19, further comprising the step of inhibiting said decoding step such that decoded data to be stored in said memory are not stored over data in said memory which have not been displayed.

21. The method of claim 17, wherein said address adjusting steps include the step of generating a plurality of said second addresses corresponding to each first addresses;

wherein said storing step includes the steps of:

separating said decoded data into a plurality of subportions corresponding to said plurality of second address, and storing said subportions of data at said respective second addresses in said memory; and wherein said retrieving step includes the steps of:

retrieving subportions of data corresponding to said plurality of second addresses from said memory, and combining said retrieved subportions of data to form said image data.

22. The method of claim 20, wherein said inhibiting step includes the steps of:

determining the number of lines of a first image which have been displayed;

determining the number of blocks of a second image which have been decoded; and inhibiting operation of said decoding step when said number of blocks exceeds a certain number proportional to said number of lines.

* * * * *

UNITED STATES PATENT AND TRADEMARK OFFICE
CERTIFICATE OF CORRECTION

PATENT NO. : 5,825,372
DATED : October 20, 1998
INVENTOR(S) : Alain Artieri

It is certified that error appears in the above-identified patent and that said Letters Patent is hereby corrected as shown below:

In column 17, line 5, delete "standard"
In column 18, line 16, delete "standard"

Signed and Sealed this

Twelfth Day of January, 1999

Attest:

Attesting Officer

*Acting Commissioner of Patents and Trademarks*